United States Patent
Andes et al.

(10) Patent No.: US 6,776,835 B2
(45) Date of Patent: Aug. 17, 2004

(54) MULTILAYER PIGMENTS BASED ON COATED METAL PLATELETS

(75) Inventors: Stephanie Andes, Hanau (DE); Sabine George, Bensheim (DE); Margarete Herbski, Gross-Bieberau (DE); Peter Reynders, Griesheim (DE); Reiner Vogt, Kranichstein (DE); Johann Dietz, Dietzenbach (DE); Helge Kniess, Weiterstadt (DE); Elke Steudel, Darmstadt (DE)

(73) Assignee: Merck Patent Gesellschaft MIT Beschrankter Haftung, Darmstadt (DE)

(*) Notice: Subject to any disclaimer, the term of this patent is extended or adjusted under 35 U.S.C. 154(b) by 0 days.

(21) Appl. No.: 10/453,479

(22) Filed: Jun. 4, 2003

(65) Prior Publication Data
US 2003/0209169 A1 Nov. 13, 2003

Related U.S. Application Data

(63) Continuation of application No. 09/762,766, filed as application No. PCT/EP99/05915 on Aug. 11, 1999, now abandoned.

(30) Foreign Application Priority Data

Aug. 14, 1998 (DE) .......................... 198 36 810

(51) Int. Cl.[7] .............................................. C04B 14/00
(52) U.S. Cl. ...................... 106/415; 106/403; 106/404; 106/417
(58) Field of Search ................................ 106/403, 404, 106/418, 431, 434, 435, 436, 441, 442, 450, 453, 456

(56) References Cited

U.S. PATENT DOCUMENTS

| | | | |
|---|---|---|---|
| 5,441,564 A | * | 8/1995 | Vogt ............................ 106/417 |
| 5,607,504 A | * | 3/1997 | Schmid et al. ............... 106/403 |
| 5,624,486 A | * | 4/1997 | Schmid et al. ............... 106/404 |

* cited by examiner

*Primary Examiner*—C. Melissa Koslow
*Assistant Examiner*—Shalie Manlove
(74) *Attorney, Agent, or Firm*—Millen White Zelano & Branigan, P.C.

(57) ABSTRACT

The present invention relates to multilayer pigments based on platelet-shaped metal substrates coated with two or more metal oxide layers by a one-pot process in an exclusively aqueous medium. The invention further relates to the use of the multilayer pigments in paints, varnishes, printing inks, including security printing inks, plastics, ceramic materials and cosmetic and for the laser formulations marking of plastics.

6 Claims, No Drawings

MULTILAYER PIGMENTS BASED ON COATED METAL PLATELETS

CROSS-REFERENCE TO RELATED APPLICATIONS

This application is a continuation application of U.S. patent application No. 09/762,766 filed Feb. 13, 2001 now abandoned, which is International Application No. PCT/EP99/05915, not published under PCT Article 21(2) in English.

The present invention relates to multilayer pigments based on platelet-shaped metal substrates coated with two or more metal oxide layers by a one-pot process in an exclusively aqueous medium. The invention further relates to the use of the multilayer pigments in paints, varnishes, printing inks, including security printing inks, plastics, ceramic materials and in cosmetic formulations.

Effect pigments are used in many sectors of industry, for example in automotive coatings, varnishes, inks, including printing inks, especially security printing inks, paints, plastics, glasses, ceramic products and cosmetic preparations.

Their optical effect is based on the directed reflection of light at predominantly sheetlike, mutually parallel-oriented, metallic or strongly refractive pigment particles. The latter are platelet-shaped and their optical properties are determined by reflection and interference.

Effect pigments providing an angle-dependent change of colour between a plurality of interference colours are by virtue of their colour play of particular interest for automotive coatings and for application in forge proof security documents. Such pigments based on multiply coated platelet-shaped metal substrates, especially aluminium platelets, are known.

U.S. Pat. No. 3,438,796 first described multilayer pigments based on a central highly reflective metal layer. Alternating $SiO_2$ and aluminium layers were deposited in a high vacuum deposition process, separated from the base film, ground and classified. The production process is such, however, that the chemical resistance of the pigment powders thus produced is very low, since the metal used is open to chemical attack at the edges. The coated aluminium pigments thus obtained are costly and the process is extremely unsuitable for practice on a large industrial scale.

U.S. Pat. No. 4,879,140 discloses a further process for producing aluminium pigments, which comprises vaporizing metal compounds in a microwave plasma in such a way that they form a film on predetermined surfaces in the chamber. This film can be mechanically removed, ground and suitably classified. This process is likewise subject to the cost and dimension disadvantages mentioned.

EP 0 668 329 A2 discloses polychromatic pigments comprising an aluminium substrate which is coated with silicon dioxide in a neutral, aqueous medium. The wet-chemical coating of the substrates is effected through hydrolytic decomposition of organic silicon compounds in an ammonia solution without a change in the pH. Thereafter, the CVD process can be used to apply further layers of, for example, metals to the $SiO_2$ coated aluminium substrates.

The patent applications EP 0 686 675 A1, EP 0 708 154 A2 and EP 0 741 170 A1 likewise each have aluminium pigments coated with metal oxide layers by means of the CVD process.

EP 0 826 745 A2 discloses aluminium-based metal pigments which are prepared by physical vapour deposition (PVD) and which are distinguished by the fact that all metal surfaces which are exposed following the comminution of a metal film produced by PVD, especially the fracture surfaces, are coated with a passivating protective layer.

The great disadvantage of all vapour deposition processes is the associated high cost.

EP 0 768 343 A2 claims lustre pigments produced by applying $SiO_2$ layers to metal substrates by hydrolytic decomposition of organic silicon compounds. The decomposition is supported by the presence of an organic solvent in which the organometallic starting components have a certain solubility. Owing to the use of organometallic components and of organic solvents, this process is not very economical and also necessitates high safety precautions.

U.S. Pat. No. 2,885,366 discloses the coating of aluminium platelets with silicon dioxide from water-glass solutions. Here, however, the oxide layer is applied only for the purpose of passivating the aluminium surface.

It is an object of the present invention to provide a multilayer pigment which is based on metal platelets and for which the base substrate is coated neither by CVD nor by PVD processes, but exclusively wet-chemically and without the use of flammable compounds. At the same time, the pigment shall be notable for its optical properties and/or the strong angle dependence of the interference colours and its advantageous application properties.

Surprisingly, there has now been found a multilayer pigment based on multiply coated platelet-shaped metal substrates where the substrate is coated with dielectrics in an aqueous medium by a one-pot process. The wet-chemically coated metal substrate is especially notable for its colour strength. Metal platelets such as aluminium, which react in water at various pH values with the evolution of hydrogen, can be converted into chemically inert multilayer pigments through suitable choice of the coating parameters.

The present invention accordingly provides multilayer pigments based on platelet-shaped metal pigments and produced by the exclusive wet-chemical coating of the metal pigments in a one-pot process wherein the metal pigments are initially suspended in water and coated with an amorphous glassy layer at pH 6–11 and then with one or more metal oxides or metal oxide mixtures at a pH<4.

The invention further provides for the use of the thus produced multilayer pigments in paints, varnishes, printing inks, including security printing inks, plastics, ceramic materials and cosmetic formulations. The invention likewise provides for the use of pigments of the invention as dopants in the laser marking of plastics.

Suitable base substrates for the multilayer pigments of the invention are platelets composed of metal or metal alloys, for example, iron, aluminium, tin, zinc, silver, copper, titanium, lanthanides, cobalt, nickel, and all commercially available metal powders known to the person skilled in the art which are substantially stable in water. It is further possible to use mixtures of the metals and metal alloys mentioned as base substrates. Preferred base substrates are aluminium platelets and also aluminium alloys.

The size of the base substrates is not critical per se and can be adapted to the particular intended application. In general, the platelet-shaped metal substrates will have a thickness between 0.1 and 5 µm, especially between 0.2 and 4.5 µm. The extent in the other two dimensions is customarily between 1 and 250 µm, preferably between 2 and 200 µm, especially between 5 and 50 µm.

The thickness of the individual metal oxide layers on the metal substrate is essential for the optical properties of the multilayer pigment. For a pigment to have intensive interference colours, the individual layers have to be accurately adjusted with regard to one another in thickness.

The colour variation with increasing film thickness is a consequence of the intensification or attenuation of certain wavelengths of the light through interference. When two or more layers in a multilayer pigment possess the same optical thickness, the colour of the reflected light intensifies with an increasing number of layers. In addition, suitable choice of the layer thicknesses is a way of obtaining particularly strong variation in colour as a function of the viewing angle. A pronounced colour flop develops. The thickness of the individual metal oxide layers depends on the field of application and is generally 10 to 1000 nm, preferably 15 to 800 nm, especially 20–600 nm, regardless of their refractive index.

The multilayer pigments of the invention generally comprise at least two metal oxide layers. Preferably, a layer of low refractive index is present in combination with a coloured or colourless metal oxide layer of high refractive index. The pigments may comprise up to 12 layers, with the proviso that the thickness of all the layers on the metal substrate should not exceed 3 µm. Preferably, the multilayer pigments of the invention contain not more than 7, especially not more than 5, metal oxide layers. Particular preference is given to pigments coated on the metal substrate initially with an amorphous glassy layer, preferably an amorphous $SiO_2$ layer, and then with $TiO_2$ and/or $Fe_2O_3$.

The amorphous glass layer on the metal substrate consists preferably of $SiO_2$, $Al_2O_3$, $AlO(OH)$, $B_2O_3$ or of the mixtures of the metal oxides mentioned. The thickness of the layer is 10–1000 nm, preferably 20–800 nm, especially 30–600 nm.

The amorphous glassy layer, for example an $SiO_2$ layer, on the substrate has an inertizing effect, so that the metal substrates thus treated can be stored in an aqueous medium for a prolonged period, whereas the untreated metal powders will have reacted, frequently before the day is out, to form the adequate oxyhydrates. Even acidic pH ranges are survived intact by the metal powders treated as well as alkaline pH ranges. The stability of the metal substrates in aqueous media may usually be increased through aftertreatment with known surface-active substances. Frequently it is advisable to passivate the metal platelets prior to coating. Passivation is effected by treating the metal powder in aqueous solution with an oxidizing agent, preferably with hydrogen peroxide or $HNO_3$. The metal substrate thus passivated is subsequently coated with the amorphous glassy layer.

The amorphous glassy layer preferably has one or more coloured or colourless highly refractive metal oxide layers applied to it. Suitable highly refractive layer materials include all highly refractive materials known to the person skilled in the art which are simple to apply to the substrate materials in filmlike fashion. Particular suitability is possessed by metal oxides or metal oxide mixtures, for example $TiO_2$, $Fe_2O_3$, $ZrO_2$, $ZnO$, $SnO_2$, $BiOCl$, pseudobrookite or compounds having a high refractive index, for example iron oxyhydrates, titanium suboxides, chromium oxides and also mixtures or mixed phases between the compounds mentioned or with other metal oxides. The thickness of this layer is 10–550 nm, preferably 15–400 nm, especially 20–350 nm.

Suitable colourless coating materials of low refractive index are preferably metal oxides or the corresponding oxyhydrates, for example $SiO_2$, $Al_2O_3$, $AlO(OH)$, $B_2O_3$ or a mixture of the metal oxides mentioned. The thickness of the layer of low refractive index is 10–1000 nm, preferably 20–800 nm, especially 30–600 nm The multilayer pigments of the invention are produced by depositing high and low refractive index interference layers of precisely defined thickness and having smooth surfaces on the inertized and optionally passivated metal substrate by hydrolytic decomposition of metal salts. A particularly important requirement is that the pH has to be readjusted for each coating step.

The initial step of producing the pigments is to suspend the metal substrates, freed of any adherent organic constituents prior to the coating operation, in water, and coat them with an amorphous glassy layer at a pH of 6–11. This amorphous layer is preferably created by precipitating $SiO_2$ from sodium or potassium silicate solutions or by hydrolytic decomposition of aluminium, tin, zinc or boron salts and of their solutions in alkaline and cationic form. Suitable materials for inertizing the metal substrates are likewise phosphates, for example zinc, tin(II), tin(IV), aluminium or zirconium phosphates.

After coating with the amorphous layer, the pH is reduced to <4 with a mineral acid. One or more hydrolysable metal salts are added to precipitate the metal oxides or metal oxyhydrates directly onto the amorphous glassy layer without secondary precipitations. The pH is customarily kept constant by the simultaneous metered addition of a base and/or acid. Lastly, the coated pigments are separated off, washed and dried and optionally calcined, the calcination temperature varying with regard to the substrate used and the particular coating present. In general, calcination temperatures are between 250 and 1000° C., preferably between 350 and 900° C.

Preferably, the metal pigments, especially aluminium platelets, are initially coated with an amorphous $SiO_2$ layer at pH 6–8. The amorphous $SiO_2$ layer then has an a $TiO_2$ layer and/or $Fe_2O_3$ layer applied to it wet-chemically in a strongly acidic medium. Preference is further given to multilayer pigments comprising a layer sequence of $SiO_2$, $SnO_2$, $TiO_2$ and/or $Fe_2O_3$ or of $SiO_2$, $SnO_2$, $TiO_2$, $SiO_2$, $SnO_2$ and $TiO_2$ or of $SiO_2$, $SnO_2$, $Fe_2O_3$, $SiO_2$, $SnO_2$ and $Fe_2O_3$.

The amorphous silicon dioxide layer can be applied as follows, for example. A potassium or sodium silicate solution is metered at pH 6–11 into a hot suspension at about 50–100° C. of the metal substrate to be coated. A dilute mineral acid such as, for example, HCl, $HNO_3$ or $H_2SO_4$ is added simultaneously to keep the pH constant. As soon as the desired layer thickness is obtained with regard to $SiO_2$, the addition of the silicate solution is stopped. The batch is subsequently stirred for about 0.5 h.

Titanium dioxide layers are preferably applied by the process described in U.S. Pat. No. 3,553,001. An aqueous titanium salt solution is gradually added to a hot suspension at about 50–100° C. of the material to be coated, while at the same time a base, for example an aqueous ammonia solution or aqueous alkali metal hydroxide solution, is metered in to maintain a substantially constant pH of about 0.5–3. As soon as the desired layer thickness is obtained with regard to $TiO_2$, the addition of the titanium salt solution and of the base is stopped. This process, also known as the titration process, is notable for avoiding an excess of titanium salt. This is achieved by supplying to the hydrolysis only that quantity per unit time which is necessary for uniform coating with the hydrated $TiO_2$ and which can be received per unit time by the available surface area of the substrates to be coated. There is therefore no production of hydrated titanium dioxide particles which are not precipitated on the surface to be coated.

The metal substrates can also be coated using the wet-chemical coating processes developed for producing pearl lustre pigments, described for example in the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602 and 32 35 017.

To enhance the light and weather stability it is frequently advisable, depending on the field of application, to subject the multilayer pigment to an aftercoating or aftertreatment. Useful aftercoatings and aftertreatments include for example the processes described in DE-C 22 15 191, DE-A 31 51 354, DE-A 32 35 017 or DE-A 33 34 598. This aftercoating further enhances the chemical stability of the pigments and/or facilitates the handling of the pigment, especially its incorporation into various application media.

The pigments of the invention are compatible with a multiplicity of colour systems, preferably from the sector of varnishes, paints and printing inks. Owing to the uncopyable effects, the multilayer pigments of the invention are particularly useful in security printing inks for the production of forgeproof security documents, for example banknotes, cheques, cheque cards, credit cards, identity cards, passes, tax stamps, postage stamps, rail and air tickets, telephone cards, lottery tickets, gift vouchers, etc.

The layer pigments are also useful for functional applications in corrosion protection and in the conductivity sector.

The pigments of the invention are likewise useful as dopants—alone or combined with other known dopants—in the laser marking of plastics. Adding the pigments in concentrations of 0.1 to 4% by weight based on the plastics system, preferably 0.5 to 2.5% by weight, especially 0.3 to 2.0% by weight, provides laser marking of high contrast. However, the concentration of the pigments in the plastic is dependent on the plastics system used. The low pigment content has little effect on the plastics system and does not affect its processibility.

All known thermoplastic polymers, as described for example in Ullmann, vol. 15, p. 457 ff., Verlag VCH, can be used for laser marking. Examples of suitable plastics are polyethylene, polypropylene, polyamides, polyesters, polyesteresters, polyetheresters, polyphenylene ethers, polyacetate, polybutylene terephthalate, polymethyl methacrylate, polyvinyl acetate, polystyrene, acrylonitrile-butadiene-styrene (ABS), acrylonitrile-styrene-acrylate (ASA), polycarbonate, polyethersulfones, polyetherketones and their copolymers and/or blends. Thermoplastic polyurethanes (TPUs) are particularly useful owing to their superior mechanical properties and the economical methods of processing. Thermoplastic polyurethanes are well-known from numerous literature publications and patents, for example GB 1 057 018 or EP 0 594 931.

The coated metal pigments are incorporated in the thermoplastic polymer by mixing the polymeric pellets with the pigment and then forming the mixture at elevated temperature. In the process of incorporating the pigments into the polymeric pellets, adhesion promoters, organic polymer compatible solvents, stabilizers and/or surfactants which are thermally stable under the operating conditions can be added, if desired. The polymer pellet/pigment mixture is generally prepared by charging a suitable mixer with the pellets, adding any additives to wet the pellets and thereafter adding the pigment and mixing it in. The plastic is generally pigmented via a colour concentrate (masterbatch) or compound. The mixture thus obtained can then be processed directly in an extruder or an injection moulding machine. The moulded articles formed in the course of the processing exhibit very homogeneous disbursement of the pigments. This is followed by the laser marking.

To mark the specimen by laser, it is introduced into the path of a pulsed laser, preferably of an Nd-YAG laser (1064 or 532 nm) or $CO_2$ laser (10.6 $\mu$m). It is also possible to mark it with an excimer laser, for example via a mask technique. However, the desired results are also obtainable with other conventional laser types which have a wavelength within a high absorption region of the pigment used. The marking obtained is determined by the irradiation time (or the number of pulses in the case of pulsed lasers) and irradiative power of the laser and of the plastics system used. The power of the laser used depends on the particular application and can in the individual case be readily determined by a person skilled in the art.

The present invention accordingly also provides for the use of the pigments in formulations such as paints, printing inks, including security printing inks, automotive finishes, varnishes, plastics, ceramic materials and cosmetic formulations, and for the laser marking of plastics.

It will be appreciated that, for the various applications, the multilayer pigments of the invention may also advantageously be used blended with other pigments, for example transparent and hiding white, colour and black pigments and with platelet-shaped iron oxides, organic pigments, holographic pigments, LCPs (liquid crystal polymers), and conventional transparent, coloured and black lustre pigments based on metal oxide-coated mica and $SiO_2$ platelets, etc. The multilayer pigments can be mixed with commercially available pigments and extenders in any proportion.

The Examples hereinbelow are intended to describe the invention more particularly without, however, limiting it.

EXAMPLES

Example 1

100 g of aluminium powder having an average particle diameter of ~20 $\mu$m (Resist 501 from Eckart Werke) and thermally freed of the organic surface treatment at 400° C. are suspended in 2 l of completely ion-free water. After 0.5 h, the addition is commenced at a metering rate of 2 ml/min, of the sodium silicate solution at pH 7.5. Altogether, 1230 g of a sodium silicate solution having an $SiO_2$ content of 13.5% are added while the pH is kept constant at 7.5 by means of hydrochloric acid. The titration is continued until the desired layer thickness is obtained. The metered addition is then terminated and the reaction completed by stirring at 90° C. for 0.5 h. The pH is then adjusted to 3.0 and the metered addition commenced at 75° C. of a 3% iron(III) chloride solution. The pH is kept constant at 3.0 using 32% sodium hydroxide solution. Once the desired layer thickness has been obtained with regard to iron(III) oxide, the batch is stirred for a further 0.5 h and filtered to collect the product. It is dried, classified and heat-treated at 400° C.

The product consists of 32.5% of aluminium, 57.5% of $SiO_2$ and 10.0% of $Fe_2O_3$ and has a characteristic red metallic lustre.

Example 2

Example 1 is repeated to coat 100 g of aluminium powder with an $SiO_2$ layer. After heating to 90° C. for 0.5 h, a titanium tetrachloride solution (400 g/l) is added at pH 1.8 at 4 ml/min until the desired layer thickness is obtained, maintained using sodium hydroxide solution. After the coating has been completed, the batch is stirred for 15 min. The product is filtered off, washed, dried and heat-treated at 400° C. The product consists of 32.5% of aluminium, 57.5% of $SiO_2$ and 10.0% of $TiO_2$ and has a characteristic silvery lustre.

Example 3

100 g of aluminium powder are suspended in 400 ml of 10% hydrogen peroxide solution and passivated by boiling for 10 minutes. The passivated aluminium powder is suspended in 2 l of completely ion-free water and the suspension is stirred for 0.5 h. The sodium silicate solution is added at a rate of 2 ml/min at a pH of 6.5. Altogether, 1230 g of a silicate solution having an $SiO_2$ content of 13.5% are added while the pH is maintained at 6.5 using hydrochloric acid. The titration is continued until the desired layer thickness is obtained. The suspension is subsequently stirred for 0.5 h and then admixed with a tin solution (11.6 g of $SnCl_4.5H_2O$ dissolved in 40 ml of 37% hydrochloric acid and made up to 400 ml with completely ion-free water) at a rate of 4 ml/min until the pH has dropped to 1.8. The pH is maintained at 1.8 using sodium hydroxide solution. On completion of the addition of the tin salt solution, the batch is stirred for 0.5 h. Thereafter, titanium tetrachloride solution (400 g/l) is added at 4 ml/min and pH 1.8 until the desired layer thickness is obtained. The pH of 1.8 is maintained using sodium hydroxide solution. Following a subsequent stirring time of 15 min, the product is filtered off, washed, dried and heat-treated at 400° C. The product consists of 33.3% of aluminium, 55.6% of $SiO_2$, 1.5% of $SnO_2$ and 9.6% of $TiO_2$ and has a characteristic silvery lustre.

Example 4

In a repeat of Example 3, 100 g of aluminium powder are initially passivated with 400 ml of 10% hydrogen peroxide solution and then coated with $SiO_2$ at pH 6.5. The suspension is subsequently stirred for 0.5 h at 90° C. and then admixed with a tin solution (11.6 g of $SnCl_4.5H_2O$ dissolved in 40 ml of 37% hydrochloric acid and made up to 400 ml with completely ion-free water) at a rate of 4 ml/min until the pH has dropped to 1.8. The pH is maintained at 1.8 using sodium hydroxide solution. On completion of the addition of the tin salt solution, the batch is stirred for 0.5 h. The pH is then adjusted to 3.0 and the metered addition commenced at 75° C. of a 3% iron(III) chloride solution. The pH is kept constant at 3.0 using 32% sodium hydroxide solution. Once the desired layer thickness has been obtained with regard to iron(III) oxide, the batch is stirred for a further 0.5 h to complete precipitation. The product is filtered off, dried, classified and heat-treated at 400° C. The product consists of 31.7% of aluminium, 52.0% of $SiO_2$, 2.0% of $SnO_2$ and 14.3% of $Fe_2O_3$ and has a characteristic light golden lustre.

Example 5

In a repeat of Example 3, 100 g of aluminium powder are initially passivated with 400 ml of 10% hydrogen peroxide solution and then coated with $SiO_2$ at pH 6.5. The suspension is subsequently stirred for 0.5 h at 90° C. and then admixed with a tin salt solution (11.6 g of $SnCl_4.5H_2O$ dissolved in 40 ml of 37% hydrochloric acid and made up to 400 ml with completely ion-free water) at a rate of 4 ml/min until the pH has dropped to 1.8. The pH is maintained at 1.8 using sodium hydroxide solution. On completion of the addition of the tin solution, the batch is stirred for 0.5 h. Thereafter, titanium tetrachloride solution (400 g/l) is added at 4 ml/min and pH 1.8 until the desired layer thickness is obtained. The pH of 1.8 is maintained during coating using sodium hydroxide solution. 15 min after completion of the titanium dioxide coating, the pH is adjusted to 6.5 with sodium hydroxide solution. The addition of the sodium silicate solution takes place at a rate of 2 ml/min. Altogether, 1230 g of a silicate solution having an $SiO_2$ content of 13.5% are added while the pH is maintained at 6.5 using hydrochloric acid. The titration is continued until the desired layer thickness is obtained. The suspension is subsequently stirred for 0.5 h and then admixed with a tin salt solution (11.6 g of $SnCl_4.5H_2O$ dissolved in 40 ml of 37% hydrochloric acid and made up to 400 ml with completely ion-free water) at a rate of 4 ml/min until the pH has dropped to 1.8. On completion of the addition of the tin salt solution, the batch is stirred for 0.5 h. Thereafter, a titanium tetrachloride solution (400 g/l) is metered in at 4 ml/min and pH 1.8 until the desired layer thickness is obtained. The pH of 1.8 is maintained using sodium hydroxide solution. Following coating and a subsequent stirring time of 15 min, the product is finally filtered off, washed, dried and heat-treated at 400° C. The product consists of 19.9% of aluminium, 66.3% of $SiO_2$, 1.8% of $SnO_2$ and 12.0% of $TiO_2$ and has a characteristic golden lustre.

Example 6

100 g of gold-coloured brass powder having an average particle diameter of 28 μm (Resist CT from Eckart Werke) and thermally freed of the organic surface treatment at 400° C. are suspended in 2 l of completely ion-free water. After 0.5 h, the addition is commenced at a metering rate of 2 ml/min, of the sodium silicate solution at pH 7.5. Altogether, 1230 g of a sodium silicate solution having an $SiO_2$ content of 13.5% are added while the pH is kept constant at 7.5 by means of hydrochloric acid. The titration is continued until the desired layer thickness is obtained. The metered addition is then terminated and the reaction completed by stirring at 90° C. for 0.5 h. The pH is then adjusted to 3.0 and the metered addition commenced at 75° C. of a 3% iron(III) chloride solution. The pH is kept constant at 3.0 using 32% sodium hydroxide solution. Once the desired layer thickness has been obtained with regard to iron(III) oxide, the batch is stirred for a further 0.5 h and filtered to collect the product. It is dried, classified and heat-treated at 400° C. The product consists of 32.3% of brass, 53.7% of $SiO_2$ and 14.0% of $Fe_2O_3$ and has a characteristic copper-golden metallic lustre.

Example 7

100 g of aluminium powder thermally freed of the organic surface treatment at 400° C. are suspended in 2 l of completely ion-free water. The pH is then adjusted to 6.0. At 75° C., the aluminium flake suspension is simultaneously but separately titrated with a solution of 20 g of $SnSO_4$ in 100 ml of completely ion-free water and a solution of 40 ml of $H_3PO_4$ (orthophosphoric acid of density 1.75 g/cm³ in 80 ml of completely ion-free water). On completion of the addition, the batch is stirred for 0.5 h to complete the reaction. The pH is then adjusted to 3.0 and the metered addition commenced at 75° C. of a 3% iron(III) chloride solution. The pH is kept constant at pH=3.0 using 32% sodium hydroxide solution. On obtainment of the desired layer thickness with regard to iron(III) oxide, the batch is stirred for a further 0.5 h and filtered to collect the product. It is dried, classified and heat-treated at 400° C. The product consists of 71.8% of aluminium, 13.8% of phosphate and 14.4% of $Fe_2O_3$ and has a characteristic red metallic lustre.

Example 8

Red-brown injection mouldings are produced in a polypropylene (Stamylan PPH, DSM), containing 0.5% of aluminium pigment of Example 1.

The marking with an Nd-YAG laser (12 ampere, 10 kHz pulse frequency and 200 mm/s) is high in contrast (dark marking) and abrasion-resistant.

The marking with a $CO_2$ laser (energy density 73 J/cm²) leads to a pale grey marking.

What is claimed is:

1. A method of making a multilayer pigment exclusively by a wet-chemical coating of a metal substrate in a one-pot process, comprising suspending the metal substrate in water at a pH 6–11 and coating with an amorphous glassy layer at a pH 6–11, and then coating with one or more metal oxides or metal oxide mixtures at a pH <4.

2. A method according to claim 1, wherein the amorphous glassy layer is created by precipitating $SiO_2$ from a sodium or a potassium silicate solution or by a hydrolytic decomposition of aluminum, tin, zinc, or boron salt.

3. A method according to claim 1, further comprising reducing the pH with a mineral acid after coating with an amorphous layer.

4. A method according to claim 3, further comprising adding one or more hydrolysable metal salts to precipitate at least one metal oxide or metal oxyhydrate directly onto the amorphous glassy layer without secondary precipitations.

5. A method according to claim 4, further comprising separating, washing, and drying an amorphous glassy coated pigment.

6. A method according to claim 5, wherein the metal substrate comprises aluminum or an alloy thereof, and the amorphous layer comprises $SiO_2$.

* * * * *

UNITED STATES PATENT AND TRADEMARK OFFICE
CERTIFICATE OF CORRECTION

PATENT NO. : 6,776,835 B2 Page 1 of 1
DATED : August 17, 2004
INVENTOR(S) : Andes, Stephanie et al.

It is certified that error appears in the above-identified patent and that said Letters Patent is hereby corrected as shown below:

<u>Column 10,</u>
Line 19, please replace "$SiQ_2$" with -- $SiO_2$ --.

Signed and Sealed this

Twenty-fourth Day of May, 2005

JON W. DUDAS
*Director of the United States Patent and Trademark Office*